Patented June 13, 1944

2,351,500

UNITED STATES PATENT OFFICE 2,351,500

PROCESS FOR GLUCONIC ACID PRODUCTION

Andrew J. Moyer, Peoria, Ill., assignor to Claude R. Wickard, as Secretary of Agriculture of the United States of America, and his successors in office No Drawing. Application February 6, 1941, Serial No. 377,696

2 Claims. (Cl. 195—32)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to an improved process for the production of gluconic acid and its salts by the fungal or bacterial fermentation of sugar solutions, and more particularly to such fermentations where relatively concentrated sugar solutions are converted to gluconic acid and its salts.

It is known that the fermentative conversion of glucose to gluconic acid proceeds more rapidly in the presence than in the absence of neutralizing agents. This circumstance is recognized as being due to the fact that the neutralizing agent eliminates the harmful effects of the acidity developed in the medim on the organism itself and on the oxidative enzyme system. It is also known that many gluconic acid-producing fungi or bacteria are able to actively ferment relatively concentrated solutions, that is, solutions containing up to about 40 percent of glucose (40 grams of glucose per 100 cc. of solution), at essentially the same rate as relatively dilute solutions, until approximately 14 grams of glucose per 100 cc. of medium has been converted. At this stage, the oxidation of the substrate to gluconic acid is markedly inhibited, owing to the precipitation of gluconic acid salts, such as calcium gluconate, in the mash. If it is attempted to circumvent this precipitation difficulty in concentrated mashes by using insufficient neutralizing agent to react with all the acid produced, another difficulty arises in that the acidity produced in the mash will markedly retard the rate of fermentation. Accordingly, up to the time of my invention, rapid and efficient gluconic acid fermentations were restricted to mashes or nutrient solutions containing not more than approximately 14 grams of glucose per 100 cc. of mash.

The terms "concentrated solution" or "concentrated mash," as used herein to describe the substrate, are to be considered as pertaining to solutions or mashes containing from 14 to 40 grams of fermentable sugar per 100 cc. of such solutions or mashes.

I have discovered a new and useful method of conducting the gluconic acid fermentation in concentrated mashes whereby the acid produced can be neutralized without the appearance of an inhibiting precipitate during the course of the fermentation. The use of my invention now permits advantage to be taken of the ability of many micro-organisms to actively ferment concentrated sugar solutions, and at the same time permits the operation of the fermentation in the presence of a quantity of neutralizing agent approximately equivalent to the amount of gluconic acid expected, thus obviating injury to the organisms or enzyme systems, as mentioned above.

I have found that the addition to the fermentation medium of small quantities of stabilizing agents, such as boric acid and its salts, aluminum chloride, calcium saccharate, calcium mannonate, calcium 2-ketogluconate, calcium lactobionate, calcium lactate, calcium methionate, or calcium idonate, prevents the precipitation of gluconic acid salts during the course of the fermentation, and thereby facilitates the use of concentrated mashes.

Although it is known that chemical compounds such as those aforementioned are capable of stabilizing supersaturated calcium gluconate solutions (U. S. Patents 2,007,786; 1,965,535; 1,989,565; 1,989,566; 2,043,211; 2,140,292; and 2,168,879; also Di Carli, "Ann. chim. applicata" 21, 447–453 (1931)), this property has not heretofore been utilized in a fermentation process. Since I use only a quantity of stabilizing agent sufficient to prevent the precipitation of gluconic acid salts, such as calcium gluconate, during the fermentation period, which quantity is only a fraction of that required permanently to stabilize pharmaceutical preparations of calcium gluconate, I choose to speak of my systems as being in a state of "temporary stabilization" in contrast to the permanent stabilization previously described by others. I am able to effect such temporary stabilization by using for 20-, 25-, 30-, and 35-percent glucose solutions, 0.28-, 0.57-, 0.85-, and 1.43-percent concentrations of boric acid or salts of boric acid, respectively, in contrast to the 3.0-percent boric acid reported by Austin (U. S. Patent 2,007,786) to be necessary to stabilize permanently a 30-percent calcium gluconate solution. I am also able to effect a temporary stabilization in fermentation mashes by adding about 1 to 2 percent of aluminum chloride, calcium lactate, calcium saccharate, calcium 2-ketogluconate, calcium lactobionate, calcium methionate, calcium marnnonate, or calcium idonate, and I may select any of the above compounds, depending upon the desired properties and uses of the fermentation product.

My invention may be practiced in the following manner: I may prepare a mash containing up to about 40 percent of glucose (40 grams of glucose per 100 cc. of mash) in addition to the usual nutrient salts. I may now inoculate the mash with active cultures of gluconic acid-producing bacteria, such as those of the genus Acetobacter, or with active cultures of gluconic acid-producing fungi, such as those of the genera Aspergillus or Penicillium, and I may add sufficient neutralizing agent, such as calcium carbonate, magnesium carbonate, zinc carbonate, or zinc oxide, substantially to neutralize all the gluconic acid to be produced during the fermentation. I may then conduct the fermentation in a suitable environment, preferably at 25° to 40° C., and preferably using rapid aeration and agitation under superatmospheric pressure of gases containing substantial quantities of oxygen, as commonly practiced in the art. I may add at the beginning of the fermentation the small quantity of stabilizing agent required to prevent the later precipitation of the gluconic acid salt, such as celcium gluconate, or I may defer the addition of this agent until the fermentation has attained a rapid rate; I prefer the latter alternative since the organisms are generally more resistant to foreign agents after good growth and active fermentation are established. I may add to 100 cc. of mash approximately 0.25 to 1.5 grams of boric acid or a salt of boric acid, such as borax, the quantity depending on the sugar concentration of the mash; or I may add approximately 0.5 to 2.0 grams of aluminum chloride, calcium saccharate, calcium mannonate, calcium 2-ketogluconate, calcium lactobionate, calcium lactate, calcium methionate, or calcium idonate. I may now continue the fermentation without interruption until the glucose of the substrate is entirely converted to gluconic acid (in the form of its salt), after which I may terminate the fermentation and either recover the product by crystallization in the usual manner, or dispose of the product is the form of a solution, after suitable clarification and purification steps have been taken.

As an alternative to terminating the fermentation after the original quantity of glucose is converted to gluconic acid I may conduct a semi-continuous process by separating the active micro-organisms from the spent mash by filtration, subsidence, or centrifugation, and by then placing them in contact with a fresh mash of any desired sugar concentration up to 40 percent, making use of a selected temporary stabilizing agent, as above, to prevent the precipitation of a gluconic acid salt during the course of the fermentation. I may repeat this operation many times, thereby obtaining a semi-continuous process.

As an alternative to adding all the temporary stabilizing agent at one time, I may add it intermittently at such intervals that sufficient stabilizing agent will always be present to prevent precipitation of the fermentation product.

Having thus described my invention, what I claim for Letters Patent is:

1. In the process of fermenting concentrated solutions of glucose to gluconic acid and salts thereof in a substantially neutral medium with aeration and agitation under superatmospheric pressure, the step of adding to the medium prior to the precipitation of the gluconic salts, at a temperature within the range 25° C. to 40° C., boric acid in a quantity equivalent to 0.25 to 1.5 grams per 100 cc. of medium, thereby preventing the precipitation of the gluconic salts formed by the fermentation without inhibiting said fermentation.

2. In the process of fermenting concentrated solutions of glucose to gluconic acid and salts thereof in a substantially neutral medium with aeration and agitation under superatmospheric pressure, the step of adding to the medium at within the range of 25° C. to 40° C. temperature and prior to the precipitation of the gluconic salts, borax in a quantity equivalent to 0.25 to 1.5 grams per 100 cc. of the medium, thereby preventing the precipitation of the gluconic salts formed by the fermentation without inhibiting said fermentation.

ANDREW J. MOYER.